United States Patent [19]

Patenaude

[11] Patent Number: 5,230,156
[45] Date of Patent: Jul. 27, 1993

[54] COOKING UTENSIL

[76] Inventor: Michael K. Patenaude, 1211 Woodruff St., Southington, Conn. 06489

[21] Appl. No.: 929,127

[22] Filed: Aug. 13, 1992

[51] Int. Cl.⁵ .............................................. A47J 43/28
[52] U.S. Cl. .................................... 30/325; 30/123.3; 99/426; D7/672
[58] Field of Search ...................... 30/324, 325, 123.3, 30/124, 125, 141, 305, 315; 99/345, 426; D7/672, 675, 688, 689, 393, 394, 395, 653

[56] References Cited

U.S. PATENT DOCUMENTS

| D. 257,202 | 10/1980 | Schessl | 99/426 |
|---|---|---|---|
| 1,076,383 | 10/1913 | Mendez | 99/426 |
| 2,252,119 | 8/1941 | Edmonds | 30/123.3 |
| 3,060,494 | 10/1962 | Noble | D7/672 |
| 4,345,516 | 8/1982 | Sinclair | 99/426 |
| 4,607,569 | 8/1986 | Murphy | 99/426 |
| 5,062,356 | 11/1991 | Frankowski | 99/426 |

FOREIGN PATENT DOCUMENTS 2450091 10/1980 France ................................. 99/426

*Primary Examiner*—Frank T. Yost
*Assistant Examiner*—Hwei-Siu Payer
*Attorney, Agent, or Firm*—Leon Gilden

[57] ABSTRACT

A cooking utensil having a base plate includes an extension flange mounted orthogonally and downwardly relative to the base plate, with the base plate and extension flange having cooperating, coplanar, and continuous side walls defining a through-extending base plate opening to receive a food component therewithin for effecting molding of the food component during a cooking procedure.

5 Claims, 4 Drawing Sheets

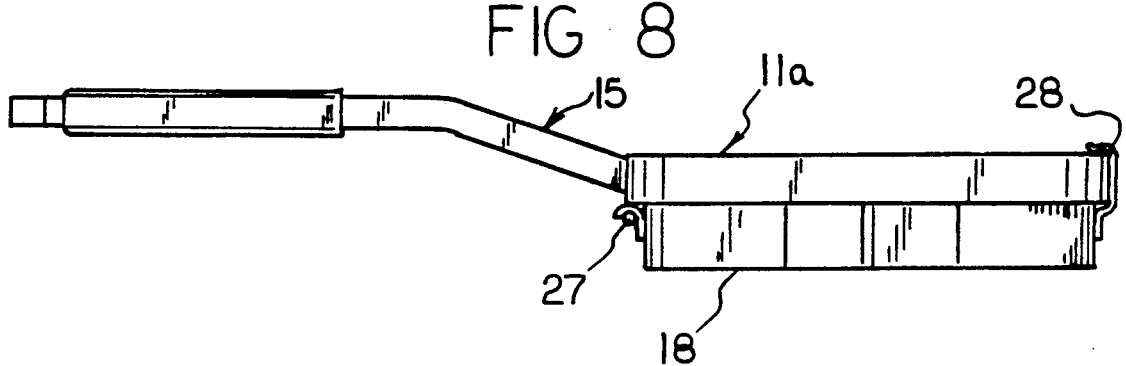
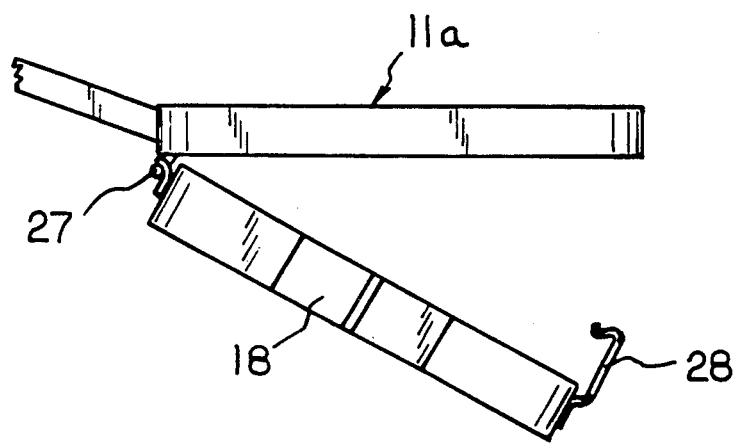

COOKING UTENSIL

BACKGROUND OF THE INVENTION

1. Field of the Invention

The field of invention relates to cooking utensil structure, and more particularly pertains to a new and improved cooking utensil wherein the same is arranged to provide for a molding structure relative to a food component during a cooking procedure.

2. Description of the Prior Art

Utensils of various types have been utilized throughout the prior art and molding structure for baking and the like has been utilized, wherein the instant invention attempts to overcome deficiencies of the prior art by providing for a cooking utensil readily manipulated for mounting upon a cooking surface to direct a food component within the utensil for the cooking and molding a food during a cooking procedure and in this respect, the present invention substantially fulfills this need not addressed in the prior art.

SUMMARY OF THE INVENTION

In view of the foregoing disadvantages inherent in the known types of utensil apparatus now present in the prior art, the present invention provides a cooking utensil wherein the same includes an opening directed through a base plate for providing a molding surface in the cooking of food upon an underlying cooking surface. As such, the general purpose of the present invention, which will be described subsequently in greater detail, is to provide a new and improved cooking utensil which has all the advantages of the prior art utensil apparatus and none of the disadvantages.

To attain this, the present invention provides a cooking utensil having a base plate including an extension flange mounted orthogonally and downwardly relative to the base plate, with the base plate and extension flange having cooperating, coplanar, and continuous side walls defining a through-extending base plate opening to receive a food component therewithin for effecting molding of the food component during a cooking procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled int he art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cooking utensil which has all the advantages of the prior art utensil apparatus and none of the disadvantages.

It is another object of the present invention to provide a new and improved cooking utensil which may be easily and efficiently manufactured and marketed.

It is a further object of the present invention to provide a new and improved cooking utensil which is of a durable and reliable construction.

An even further object of the present invention is to provide a new and improved cooking utensil which is susceptible of a low cost of manufacture with regard to both materials and labor, and which accordingly is then susceptible of low prices of sale to the consuming public, thereby making such cooking utensils economically available to the buying public.

Still yet another object of the present invention is to provide a new and improved cooking utensil which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an orthographic side view of the invention indicating the extension flange pivotally mounted relative to the base plate.

FIG. 9 is an orthographic side view indicating the extension flange separated from the base plate for ease of cleaning of the extension flange relative to the base plate.

DESCRIPTION OF THE PREFERRED EMBODIMENT

Figure 1:
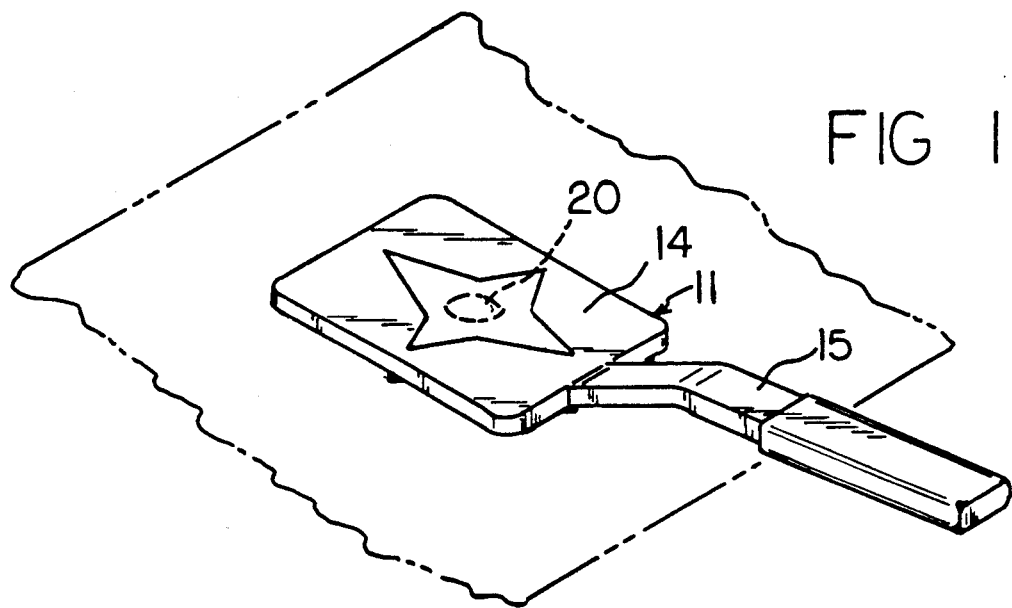
FIG. 1 is an isometric illustration of the instant invention.
Figure 2:
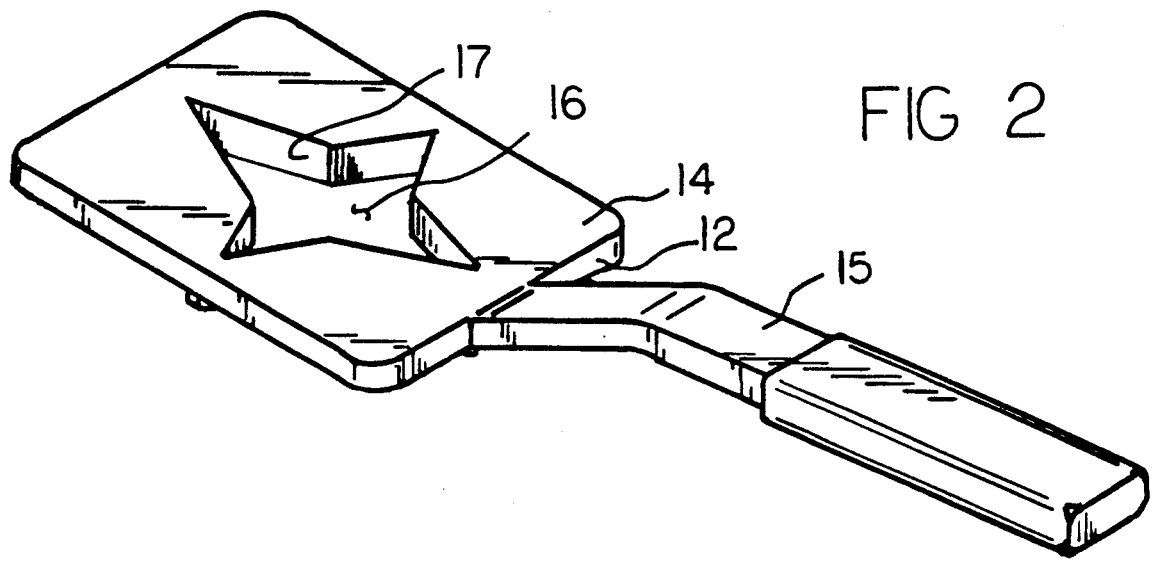
FIG. 2 is an isometric illustration enlarged illustration of the invention.
Figure 3:
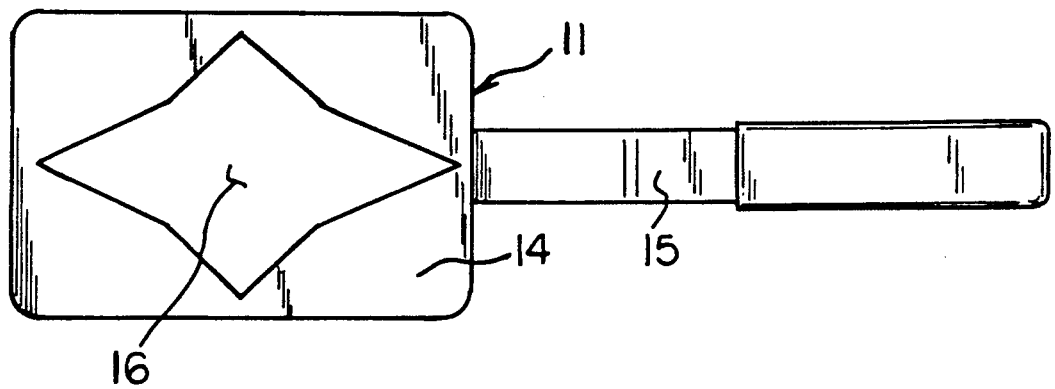
FIG. 3 is an orthographic top view of the invention.
Figure 4:
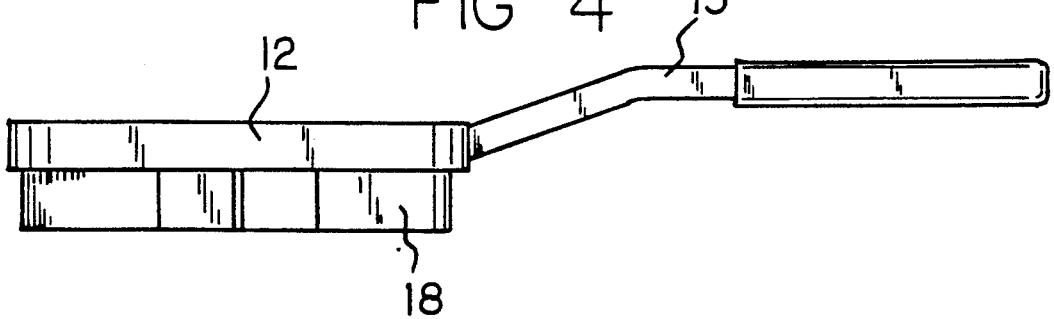
FIG. 4 is an orthographic side view of the invention.
Figure 5:
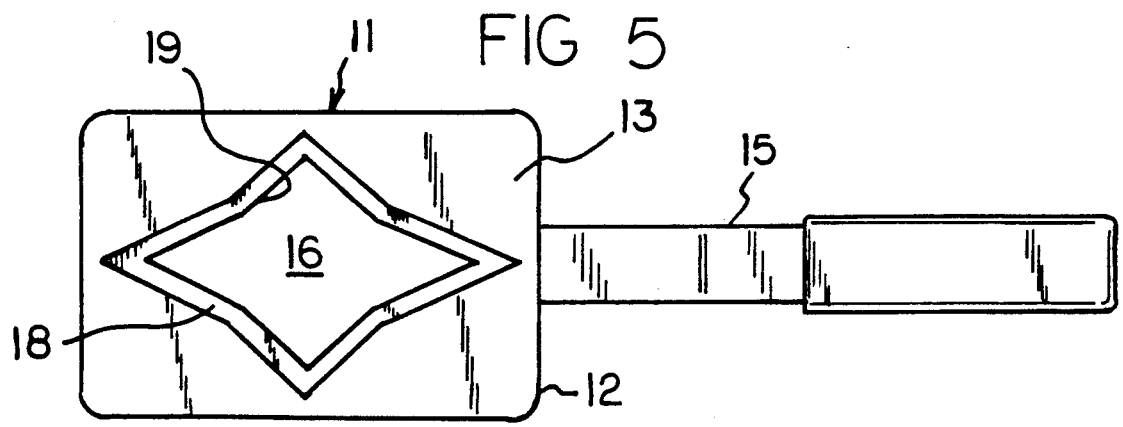
FIG. 5 is an orthographic bottom view of the invention.
Figure 6:
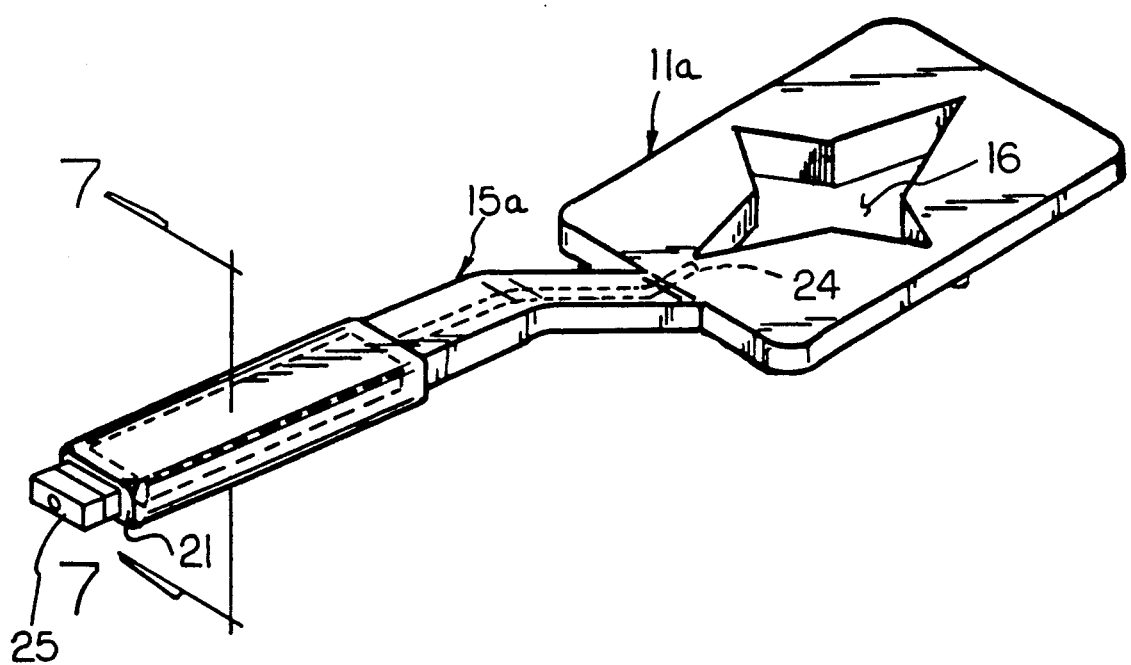
FIG. 6 is an isometric illustration of a modified aspect of the invention.
Figure 7:
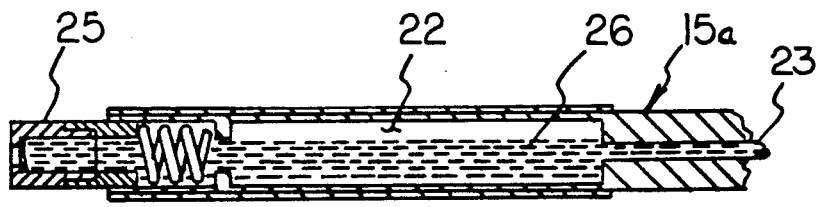
FIG. 7 is an orthographic view, taken along the lines 7—7 of FIG. 6 in the direction indicated by the arrows.

With reference now to the drawings, and in particular to FIGS. 1 to 9 thereof, a new and improved cooking utensil embodying the principles and concepts of the present invention and generally designated by the reference numerals will be described.

More specifically, the cooking utensil of the instant invention essentially comprises a base plate 11 of rigid construction, having a continuous side wall 12, with a planar bottom wall 13 spaced from and parallel a planar top wall 14. A handle 15 is integrally and orthogonally mounted to the side wall extending from the side wall and canted upwardly over the top wall 14. A base plate opening 16 having a predetermined configuration is directed through the base plate, with a continuous base plate side wall 17. An extension flange 18 integrally and orthogonally mounted to the bottom wall 13 is positioned in a spaced relationship relative to the side wall having said predetermined configuration, and including a continuous extension flange side wall structure 19 coplanar with the base plate opening side wall 17. The extension flange side wall is spaced from the base plate side wall 12 to accommodate cooking pans and the like and position the base plate in a spaced relationship thereover, while providing clearance for such cooking pan side walls between the extension flange and the base plate side wall structure 12. Further it should be noted that the extension flange 18 may be formed of a ferromagnetic material for magnetic adherence to an underlying cooking surface. In this manner when a food component 20 (see FIG. 1) is directed into the opening 16, molding the component during a cooking procedure is effected when positioned upon an underlying cooking surface (not shown) of any desired configuration.

The FIGS. 6-9 indicate a modified base plate 11a cooperative with a modified handle structure 15a. The modified handle structure 15a includes a handle free end wall 21 spaced from the base plate 11a, with a reservoir cavity 22 positioned within the handle 15a in fluid communication with the base plate opening 16 through a handle conduit 23. The handle conduit 23 includes a conduit outlet port 24 directed into the base plate opening 16, wherein a plunger 25 reciprocatably mounted through the handle free end wall 21 permits projection of a cooking fluid, such as cooking oil and the like 26 within the reservoir cavity 22 to direct such cooking oil, food colorings, and the like into the base plate opening 16.

The FIGS. 8 and 9 further indicate the use of a hinge 27 mounted to the base plate bottom wall 13 and the extension flange 18 to hingedly mount the extension flange 18 relative to the base plate, with a latch 28 mounted to the extension flange 18 for selective securement to the base plate 11a for contiguous communication of the extension flange relative to the base plate 11a during a cooking procedure and permitting separation of the components for ease of cleaning of the components relative to one another. Further in this manner, the extension flange 18 may be removably mounted relative to the base plate to provide for the extension flange having alternative configurations relative to the said predetermined configuration to provide for a unique cooking mold configuration in use. The plunger 25 as noted has a spring member interposed between the plunger and a reservoir flange to normally bias the plunger 25 in an extended orientation relative to the reservoir 22 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cooking utensil, comprising,
   a base plate, the base plate having a planar top wall and a planar bottom wall spaced from and parallel the top wall, and
   a continuous base plate side wall extending between the bottom wall and the top wall, and
   a handle integrally and orthogonally mounted to the side wall extending beyond the base plate and canted over the top wall, and
   the base plate including a base plate opening having a predetermined configuration directed from the base plate bottom wall through the base plate top wall, and
   an extension flange integrally and orthogonally mounted to the base plate bottom wall, with the extension flange formed of said predetermined configuration, and includes and extension flange continuous side wall, wherein the base plate opening includes a base plate opening side wall, wherein the base plate opening side wall and the extension flange side wall are in a coplanar orientation relative to one another.

2. The cooking utensil as set forth in claim 1 wherein the extension flange is of a ferrous magnetic material.

3. The cooking utensil as set forth in claim 2 wherein the extension flange is in a spaced relationship relative to the base plate side wall to provide for clearance for a cooking pan positioned below the base plate.

4. The cooking utensil as set forth in claim 3 wherein the handle includes a handle free end wall spaced from the base plate, and wherein the handle further includes a reservoir cavity within the handle, and the handle free end wall includes a plunger reciprocatably mounted through the handle free end wall in communication with the reservoir cavity, and a fluid conduit, the fluid conduit extending from the reservoir cavity to the base plate opening in fluid communication with the base plate opening having an outlet port within the base plate opening.

5. The cooking utensil as set forth in claim 4 wherein the reservoir cavity includes a reservoir flange, and the plunger includes a spring captured between the reservoir flange and the plunger within the reservoir cavity to normally bias the plunger in a spaced relationship relative to the handle free end wall.

* * * * *